US010163007B2

(12) United States Patent
Lee et al.

(10) Patent No.: US 10,163,007 B2
(45) Date of Patent: Dec. 25, 2018

(54) DETECTING ORIENTATION OF TEXTUAL DOCUMENTS ON A LIVE CAMERA FEED

(71) Applicant: INTUIT INC., Mountain View, CA (US)

(72) Inventors: Daniel Lee, Mountain View, CA (US); Vijay Yellapragada, Mountain View, CA (US); Shailesh Soliwal, Redwood City, CA (US); Peijun Chiang, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 15 days.

(21) Appl. No.: 15/499,666

(22) Filed: Apr. 27, 2017

(65) Prior Publication Data
US 2018/0314884 A1 Nov. 1, 2018

(51) Int. Cl.
| G06K 9/00 | (2006.01) |
| G06K 9/18 | (2006.01) |
| G06T 7/70 | (2017.01) |
| G06T 7/11 | (2017.01) |
| G06Q 40/00 | (2012.01) |

(52) U.S. Cl.
CPC ........... G06K 9/00463 (2013.01); G06K 9/18 (2013.01); G06Q 40/123 (2013.12); G06T 7/11 (2017.01); G06T 7/70 (2017.01)

(58) Field of Classification Search
None
See application file for complete search history.

(56) References Cited

U.S. PATENT DOCUMENTS

| 2013/0195376 A1* | 8/2013 | Baheti | G06K 9/00456 382/289 |
| 2014/0247470 A1* | 9/2014 | Hunt | G06T 3/0031 358/302 |

OTHER PUBLICATIONS

Combined Orientation and Skew Detection using Geometric Text-Line Modeling. Van Beusekom et al., Jan. 2010.*
Handbook of Character Recognition and Document Image Analysis. Bunke et al. 1997.*
Joost Van Beusekom et al., "Combined Orientation and Skew Detection Using Geometric Text-Line Modeling", International Journal of Document Analysis and Recognition (IJDAR), Springer, Berlin, DE, vol. 13, No. 2, Jan. 16, 2010 (Jan. 16, 2010), pp. 1-14.

(Continued)

Primary Examiner — Delomia L Gilliard
(74) Attorney, Agent, or Firm — Patterson + Sheridan, LLP

(57) ABSTRACT

The present disclosure relates to the extraction of text from an image including a depiction of a document. According to one embodiment, a mobile device receives an image depicting a document. The mobile device identifies a plurality of text areas in the document and identifies a midpoint of each of the plurality of text areas in the document. The mobile device detects one or more lines of text in the document including a plurality of text areas, where the plurality of text areas included in a line of text are associated with a midpoint having a coordinate within a threshold number of pixels on one axis in a two-dimensional space. Based on an orientation of the detected one or more lines of text, the mobile device determines a probable orientation of the document and extracts text from the image based on the determined probable orientation of the document.

20 Claims, 7 Drawing Sheets

(56) References Cited

OTHER PUBLICATIONS

Dengel, A et al., "Chapter 8 Techniques for Improving OCR Results" In: Bunke H et al: "Handbook of character recognition and document image analysis", Jan. 1, 1997 (Jan. 1, 1997), World Scientific, XP002402960, ISBN: 978-981-02-2270-3 32 pages.
Baird H S., "The Skew Angle of Printed Documents", Symposium on Hybrid Imaging Systems and SPSE's Annual Conference: Advanced Printing of Symposium/Conference Summa, vol. 1, Jan. 1, 1987, 4 pages.
David Doermann: "Handbook of Document 1-20 Image Processing and Recognition" In: "Handbook of Document mage Processing and Recognition" Jan. 1, 2014 (Jan. 1, 2014)t Springer, 10 pages.
PCT/US2017/032497, International Search Report, dated Feb. 7, 2018, 17 pages.

\* cited by examiner

DETECTING ORIENTATION OF TEXTUAL DOCUMENTS ON A LIVE CAMERA FEED

BACKGROUND

Field

Embodiments presented herein generally relate to optical character recognition, and more specifically to detecting document orientation from an image of a document to perform optical character recognition on the document.

Description of the Related Art

Data processing is essential for a variety of business and personal transactions. For example, businesses use accounting and inventory data to generate and share reports related to various business metrics, such as sales, invoices, cash flow, or balance sheet information. In another example, individuals use income data from various sources (e.g., employers, passive investments, active investments, retirement plans) to determine tax liabilities (or entitlements to tax refunds) and prepare and file tax returns with the relevant tax authorities.

In many cases, individuals receive paper documents including the data needed to complete a business or personal transaction. For example, individuals may receive a variety of tax documents (e.g., W-2 forms with employment income for an individual, 1099-DIV forms reporting dividend income, 1099-INT forms reporting interest income, K-1 forms reporting partnership income, and so on) as paper documents to input into a computer to determine tax liabilities or eligibility for tax refunds and generate an individual tax return. Businesses may receive invoices from a variety of suppliers and generate invoices for goods or services rendered to customers. The received and generated invoices may be subsequently provided as input to a computer to generate, for example, a cash flow statement for a predetermined time period. In many cases, the documents used in these data processing operations may not have a consistent format. For example, while different W-2 forms generally include the same types of data (e.g., employer identification, taxable income, taxes withheld, and so on), locations of the data on a given form or document may vary across documents received from different sources.

To extract the data out of such documents, a computer may use an optical character recognition (OCR) system to convert an image of a document into machine-encoded text. An OCR system generally receives an image as input, binarizes the image to generate a black-and-white image for analysis, and uses the binarized image to extract text from the image. The OCR system may extract text from the image, for example, on a field-by-field basis for a structured or semi-structured document or on an ad-hoc basis for an unstructured document. In some cases, to extract textual data from a document, an OCR system may rotate a received image multiple times before extracting usable data from the document. Failures to extract usable data from the documents generally increase an amount of processing overhead involved in performing optical character recognition on a document, which may delay data processing and reduce battery life of mobile devices on which document capture and OCR operations are performed.

SUMMARY

One embodiment of the present disclosure includes a method for extracting text from a document depicted in an image. The method generally includes receiving an image depicting a document. A plurality of text areas are identified in the document, and a midpoint of each of the plurality of text areas in the document are identified. A device detects one or more lines of text in the document including a plurality of text areas, where the plurality of text areas included in a line of text are associated with a midpoint having a coordinate within a threshold number of pixels on one axis in a two-dimensional space. Based on an orientation of the detected one or more lines of text, a device determines a probable orientation of the document based on an orientation of the detected one or more lines of text. The device extracts text from the image based on the determined probable orientation of the document.

Another embodiment provides a computer-readable storage medium having instructions, which, when executed on a processor, performs an operation for extracting text from a document depicted in an image. The operation generally includes receiving an image depicting a document. A plurality of text areas are identified in the document, and a midpoint of each of the plurality of text areas in the document are identified. A device detects one or more lines of text in the document including a plurality of text areas, where the plurality of text areas included in a line of text are associated with a midpoint having a coordinate within a threshold number of pixels on one axis in a two-dimensional space. Based on an orientation of the detected one or more lines of text, a device determines a probable orientation of the document based on an orientation of the detected one or more lines of text. The device extracts text from the image based on the determined probable orientation of the document.

Still another embodiment of the present invention includes a processor and a memory storing a program, which, when executed on the processor, performs an operation for extracting text from a document depicted in an image. The operation generally includes receiving an image depicting a document. A plurality of text areas are identified in the document, and a midpoint of each of the plurality of text areas in the document are identified. A device detects one or more lines of text in the document including a plurality of text areas, where the plurality of text areas included in a line of text are associated with a midpoint having a coordinate within a threshold number of pixels on one axis in a two-dimensional space. Based on an orientation of the detected one or more lines of text, a device determines a probable orientation of the document based on an orientation of the detected one or more lines of text. The device extracts text from the image based on the determined probable orientation of the document.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Optical character recognition (OCR) systems are often used to import data from paper and/or electronic documents into data processing systems. OCR systems generally use an image obtained from a scanner, camera, or other image capture system as a source image, identify a document in the image, and attempt to identify textual content in the image. When an OCR system identifies textual content in a document, the OCR system can generate a text file with the identified content. The text file can subsequently be used as input to a data processing system. For example, in a tax preparation workflow, a text file with content from a W-2 may be provided as input to generate a tax return and determine tax liabilities or entitlement to refunds. In another example, a text file with content from a supplier invoice may be used as input into an accounting program to generate ledger entries and a cash flow statement for a set time period.

In some cases, an OCR system may receive an image of a document that is rotated in an orientation other than the proper orientation (e.g., with text flowing from left to right and from top to bottom for documents written in left-to-right script languages (e.g., English, French, German, Russian, and the like), or with text flowing from right to left and top to bottom for documents written in right-to-left script languages (e.g., Hebrew, Arabic, and so on)). The OCR system can attempt to extract text from the image as received (which, as discussed above, may be oriented in an orientation other than the proper orientation for the language in which the document is written). Upon failing to extract text from the image, the OCR system generally rotates the image in steps (e.g., by 90 degrees in an anticlockwise or clockwise direction) until the OCR system is able to extract text from the image. Because rotating an image and attempting to extract text from an image is a computationally expensive process, an OCR system may waste resources attempting to extract text from a document. For example, in a worst-case scenario, the OCR system may perform four text extraction attempts (on the image as received, rotated 90 degrees, rotated 180 degrees, and rotated 270 degrees) before the OCR system is able to successfully extract text from the document.

Embodiments presented herein provide techniques for determining a probable orientation of a document included in an image before attempting to extract text from the document included in the image. By determining a probable orientation of a document before attempting to extract text from the document, an OCR system can reduce the number of rotations that may be needed to orient the document in a manner that allows for usable text to be extracted from the document.

Figure 1:
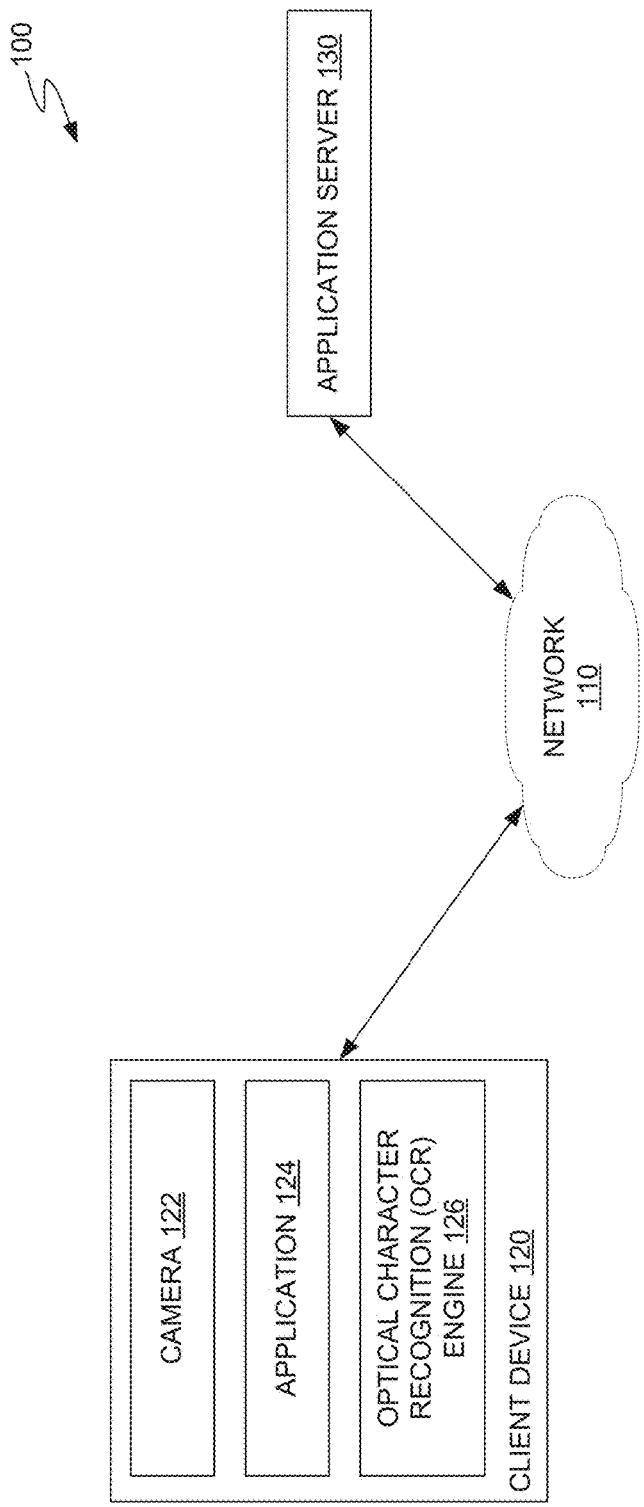
FIG. 1 illustrates an example computing environment, according to one embodiment.

FIG. 1 illustrates an example networked computing system for performing optical character recognition using video or a stream of images captured on a mobile device, according to one embodiment of the present disclosure. As illustrated, computing system 100 includes a client device 120 and application server 130, connected via network 110.

Mobile device 120 may be, for example, a smartphone, tablet computer, handheld personal computer. As illustrated, mobile device 120 generally includes a camera 122, an application 124, and optical character recognition (OCR) engine 126.

Camera 122 is generally configured to capture still images and video (or a stream of still images) of a source document to be analyzed by OCR engine 124. Camera 122 may provide a buffer to store video frames or a stream of images while OCR engine 124 processes a frame and determines whether to request a new frame from camera 122 for processing. While camera 122 captures video frames or a stream of still images, camera 122 may adjust focus, lighting, contrast, exposure settings, and so on to attempt to obtain a clear image of a source document. Camera 122 may continually adjust camera settings until mobile device 120 completes character recognition operations for the source document.

Application 124 generally allows a user to interact with an application hosted on application server 130 and/or local resources on client device 120. In some cases, a user can invoke OCR engine 126 to capture an image of a document via camera 122 and extract text from a captured image. The text extracted from an image of a document may be processed locally by application 124 or transmitted to application server 130 for processing. For example, a user can scan a tax form, such as a W-2 income statement, and the data extracted from the tax form can be transmitted to application server 130 to determine a user's tax liabilities or entitlement to a tax refund. In another example, a user can scan a receipt to add an expenditure to an accounting application hosted locally on client device 120 or remotely by application server 130.

OCR engine 126 is generally configured to obtain a video frame or image in a stream of images from camera 122 and extract textual content from a document included in the video frame or image. To obtain an image for analysis, OCR engine 126 generally instantiates a live camera feed to obtain one or more video frames or images from a stream of images from a buffer at camera 122. After obtaining the video frame or image, OCR engine 126 binarizes the image to generate a black-and-white version of the image (and of the document included in the image). In a binarized image, text and (in structured or semi-structured documents) field boxes may be rendered in black, while negative space may be rendered in white.

Using the binarized image, OCR engine 126 generally identifies blocks of characters (e.g., corresponding to words or combinations of words) in the document depicted in the image. In some cases, OCR engine 126 overlays boxes over a plurality of areas in the image that OCR engine 126 has determined is likely to include textual content to be extracted from the document depicted in the image. To determine whether an area of an image is likely to include textual content to be extracted from the document depicted in the image, OCR engine 126 can examine regions of a document for, for example, contiguous areas in which a small number of black pixels are surrounded by a larger number of white pixels in the image.

OCR engine 126 generally determines the midpoint of each box and records the pixel coordinates for each midpoint for analysis. In some cases, after identifying a threshold number of probable text areas and the midpoint of each of the probable text areas, OCR engine 126 can determine a probable orientation of the document depicted in the image. In some cases, the probable orientation can be defined as a pair of rotations. A first pair of rotations may be defined as a mirroring about the horizontal axis (a 0 degree rotation of the image and a 180 degree rotation of the image), and a second pair of rotations may be defined as a mirroring about the vertical axis (a 90 degree rotation of the image and a 270 degree rotation of the image).

To identify the probable orientation of the document depicted in the image, OCR engine 126 can compare the midpoints of the identified blocks of characters to determine a pattern in which the midpoints are aligned. Because text is typically written in a straight line, OCR engine 126 can attempt to identify straight or substantially straight line patterns between the midpoints of the identified blocks of characters to determine the probable orientation of the document depicted in the image. A substantially straight line pattern may be determined, in some cases, as a set of midpoints having a horizontal or vertical coordinate within a threshold number of pixels.

Based on the identified straight line patterns and localization information indicating a direction in which text in a document is arranged, OCR engine 126 can determine a probable orientation of the document. For example, if OCR engine 126 is operating in an area in which text is written in Latin or Cyrillic character sets, OCR engine 126 can determine that text should be written in a left-to-right orientation. Correspondingly, a proper, right-side-up orientation of the document depicted in an image generally entails the midpoints of text identified in the document to be arranged on substantially the same axis horizontally. If OCR engine 126 determines that a plurality of straight line patterns are horizontal and that text should be written in a left-to-right orientation, OCR engine 126 can determine that the probable orientation of the document depicted in the image is a horizontal orientation. Thus, OCR engine 126 can determine that OCR engine 126 is to attempt to extract text from the document using the image as received and a 180 degree rotation of the image (i.e., mirrored about the horizontal axis). In contrast, if OCR engine 126 identifies a plurality of vertical lines corresponding to the midpoints of text identified in the document and that the document is expected to be written in a left-to-right orientation, OCR engine 126 can determine that the document depicted in the image was captured in a vertical orientation. Thus, OCR engine 126 can attempt to extract text from the document using a 90 degree rotation of the received image and a 270 degree rotation of the received image. Similarly, where a document is expected to be written in a top-to-bottom orientation, OCR engine 126 can examine a plurality of lines corresponding to midpoints of text to determine whether the document depicted in the image is in a vertical orientation (and thus, that OCR engine 126 is to attempt to extract text from the image as received and from a 180 degree rotation of the image) or a horizontal orientation (and thus, that OCR engine 126 is to attempt to extract text from a 90 degree rotation of the image and a 270 degree rotation of the image).

In some cases, OCR engine 126 can determine that a document depicted in an image is rotated in an orientation other than a substantially horizontal or substantially vertical orientation. To do so, OCR engine 126 can attempt to identify a plurality of diagonal lines connecting midpoints of different text blocks that are substantially parallel to each other. OCR engine 126 can rotate the image until the plurality of diagonal lines are re-aligned to a substantially vertical or horizontal orientation. As discussed above, OCR engine 126 can subsequently determine a probable orientation of the rotated image to determine the pair of rotations to use to extract text from the document.

Based on the pair of rotations identified for the document, OCR engine 126 can rotate the received image to a first rotation in the pair and attempt to extract text from the rotated image. After extracting text from the rotated image, OCR engine 126 determines whether usable text has been extracted from the document depicted in the image. OCR engine 126 may determine whether usable text has been extracted from the document depicted in the image, for example, if strings of characters extracted from the document match entries in a dictionary. If OCR engine 126 determines that the first rotation of the image resulted in the extraction of usable text, OCR engine 126 need not take any further action. Otherwise, if OCR engine 126 is unable to extract usable text from the rotated image, OCR engine 126 can determine that the second rotation in the pair of rotations should be used for extracting text from the image. OCR engine 126 rotates the image to the second rotation identified in the pair of rotations and extracts text from the document depicted in the image. Upon extracting text from the image, OCR engine 126 can provide the extracted text to application 124 for processing and/or transmission to application server 130 for processing.

Application server 130 generally includes one or more remote services hosting at least portions of an application accessible through client device 120. Data may be received from client device 120 (e.g., upon extraction from an image captured by a camera on client device 120, as discussed above), and the received data may be processed according to the capabilities of the application server 130. For example, if client device 120 provides textual information related to a W-2 wage statement to an application server 130 hosting a tax preparation workflow, application server 130 can use the received wage information to determine a user's tax liability or entitlement to a tax refund. In another example, if client device 120 provides textual information related to a receipt for goods or services to an application server 130 hosting an accounting workflow, application server 130 can use the received expenditure information to update a user's account balances, cumulative tax deductible expenditures for a tax year, and the like.

Figure 2:
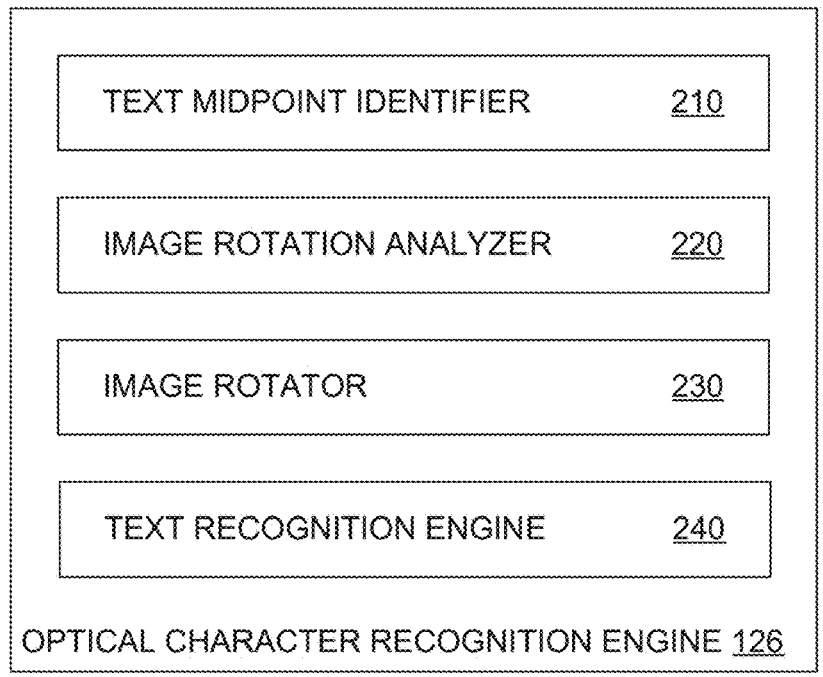
FIG. 2 illustrates an example optical character recognition (OCR) engine, according to one embodiment.

FIG. 2 illustrates an example optical character recognition (OCR) engine 126, according to an embodiment. As illustrated, OCR engine 126 generally includes a text midpoint identifier 210, image rotation analyzer 220, image rotator 230, and text recognition engine 240.

Text midpoint identifier 210 generally receives an image from a camera on client device 120 (e.g., a still image, an image from a live camera feed, and the like) and binarizes the image prior to processing. To binarize the image, text midpoint identifier generally compares the color value of each pixel in the image to a threshold value. Pixels with a color value below the threshold value may be converted to a first color (e.g., white, represented by RGB value 0 0 0), and pixels with a color value above the threshold value may be converted to a second color (e.g., black, represented by RGB value 255 255 255). After binarizing the image, text midpoint identifier 210 attempts to identify blocks of text in a document depicted in an image. As discussed above, to identify blocks of text in a document, text midpoint identifier 210 can examine the received image for contiguous patterns of a small number of black pixels surrounded by a larger number of white pixels. In some cases, text midpoint identifier 210 can use threshold amounts of whitespace between characters to determine where a first block of text ends and a second block of text begins (if any). In some cases, when text midpoint identifier 210 identifies a block of text in an image, text midpoint identifier 210 can position a box over the identified block of text. After identifying a block of text (or probable block of text) in an image, text midpoint identifier identifies the midpoint of the block (e.g., the midpoint of the box positioned over the identified block of text) and records the coordinates of the midpoint for use in determining a probable orientation of the document depicted in the captured image. In some cases, text midpoint identifier 210 need not analyze an entire image to identify blocks of text (or probable blocks of text) in the document. Text midpoint identifier 210, in some cases, can examine an image until a threshold number of text blocks are identified.

Image rotation analyzer 220 uses the midpoints of identified text blocks recorded by text midpoint identifier 210 to determine a probable orientation of the document depicted in an image. As discussed above, image rotation analyzer 220 can examine the recorded coordinates of midpoints identified by text midpoint identifier 210 to determine whether a threshold number of midpoints are aligned or substantially aligned on an axis (e.g., aligned horizontally or vertically). In some cases, image rotation analyzer 220 can determine that text midpoints are substantially aligned based on whether a set of midpoints are positioned within a threshold number of pixels on either the horizontal or vertical axes. When image rotation analyzer 220 determines that a number of midpoints are substantially aligned on the horizontal or vertical axis, image rotation analyzer 220 can use the alignment of midpoints as information about whether the document is expected to be written horizontally (left-to-right or right-to-left) or vertically (top-to-bottom or bottom-to-top) to determine a probable orientation of the document. As discussed above, a probable orientation of the document may comprise a pair of rotations indicating how the document is to be processed. If image rotation analyzer 220 determines that a plurality of midpoints are substantially aligned horizontally and the document is expected to be written horizontally, image rotation analyzer 220 determines that the document is either oriented correctly (needing a 0 degree rotation) or upside down (needing a 180 degree rotation). If image rotation analyzer 220, however, determines that the plurality of midpoints are substantially aligned vertically and that the document is expected to be written vertically, image rotation analyzer 220 determines that the document is rotated sideways and that the document should be rotated 90 degrees or 270 degrees clockwise (or 90 degrees clockwise and 90 degrees anticlockwise) in order to successfully extract text from the document depicted in the image.

Image rotator 230 generally receives an indication of the probable orientation of the document depicted in an image from image rotation analyzer 220 and uses the indication to perform a first rotation of the image. As discussed above, the first rotation may be a 0 degree rotation of the image if image rotation analyzer 220 determines that the document depicted in the image is oriented horizontally and that the document is written in a left-to-right or right-to-left language. The first rotation may be a 90 degree clockwise or anticlockwise rotation of the image if image rotation analyzer 220 determines that the document is oriented vertically and that the document is written in a left-to-right or right-to-left language. After performing the first rotation, image rotator 230 passes the image to text recognition engine 240 to attempt to extract text from the image.

If text recognition engine 240 is unable to extract text from the image provided by image rotator 230, text recognition engine 240 generally indicates to image rotator 230 that the image should be rotated to the second rotation in the pair of rotations identified by image rotation analyzer 220 (e.g., should be rotated by 180 degrees from the first rotation angle). In response to such an indication, image rotator 230 can rotate the initial image by the rotation angle specified in the pair of rotation angles (e.g., rotate the image by 180 degrees for a document in a probable horizontal orientation or by 90 degrees anticlockwise). In some cases, image rotator 230 can store the image resulting from the first rotation and rotate the image resulting from the first rotation by 180 degrees. Once the image is rotated to the second rotation specified in the pair of rotations, image rotator 230 passes the image to text recognition engine 240 for processing.

Text recognition engine 240 generally examines a received image for usable text and attempts to extract text content from the received image. To extract text content from the received image, text recognition engine 240 attempts to recognize patterns of pixels corresponding to characters in a specified character set or portions of characters in the character set. Text recognition engine 240 can organize successive characters into words, and text recognition engine 240 can recognize successive words based on the presence of whitespace between characters exceeding a threshold value. In some cases, after extracting text from a document depicted in an image, text recognition engine 240 can compare the extracted text to a dictionary of known words to determine whether the text extraction process was successful. If text recognition engine 240 determines that a threshold number of words extracted from the document depicted in an image match known words in a dictionary, text recognition engine 240 can determine that text was successfully extracted from the document and that image rotator 230 need not rotate the image again. Otherwise, if text recognition engine 240 determines that the words extracted from the document do not match known words in a dictionary or if text recognition engine 240 is unable to extract text from the document, text recognition engine 240 can indicate to image rotator 230 that the image should be rotated to the second rotation in the pair or rotations associated with the probable orientation of the document, as discussed above.

Figure 3:
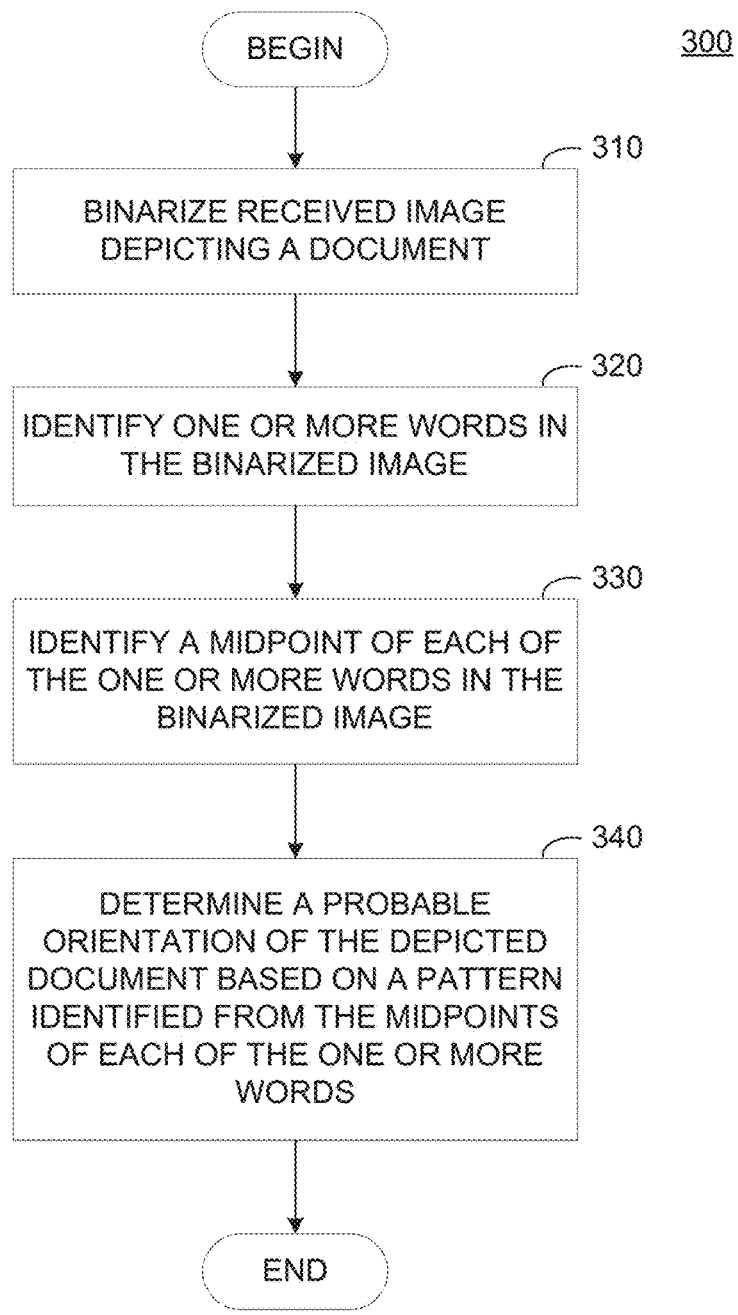
FIG. 3 illustrates an example method for detecting a probable orientation of a document depicted in an image, according to one embodiment.

FIG. 3 illustrates example operations that may be performed by an optical character recognition (OCR) engine 126 to determine a probable orientation of a document depicted in an image, according to an embodiment. As illustrated, operations 300 begin at step 310, where OCR engine 126 binarizes a received image depicting a document. OCR engine 126 generally receives an image depicting a document as a frame in one or more frames captured from a live camera feed or a still image captured by a camera (e.g., a camera integrated into or attached to a mobile phone or tablet). As discussed above, OCR engine 126 can binarize an image by applying a thresholding technique to each pixel in the image, where pixel color values below the threshold value are rendered in the binarized image as negative space (e.g., as white pixels with an RGB color value of 0 0 0) and pixel color values above the threshold value are rendered in the binarized image as positive space (e.g., as black pixels with an RGB color value of 255 255 255).

At step 320, OCR engine 126 attempts to identify one or more words in the binarized image. To identify words in an image, OCR engine 126 generally examines discrete regions of the image to identify contiguous patterns of white pixels (representing negative space) surrounding a small number of black pixels. In some cases, OCR engine 126 can identify the existence of words in a document based on identifying a number of successive characters on the same axis (e.g., a number of characters substantially aligned horizontally or vertically). OCR engine 126 can identify the end of one word and the beginning of another word based on the existence of an amount of whitespace exceeding a threshold amount of whitespace that may be expected to be present between successive characters in the same word.

At step 330, OCR engine 126 identifies a midpoint of each of the one or more identified words in the binarized image. Because words may be assumed to include a plurality of characters that are substantially aligned with each other along a single axis, OCR engine 126 can determine the midpoint of each of the one or more identified words by overlaying a box over a set of successive characters presumed to be a word and identifying the midpoint coordinate of the box overlaid over a set of characters (e.g., as X-Y coordinates in the overall image).

At step 340, OCR engine 126 determines a probable orientation of the document depicted in the image based on patterns identified from the midpoints of each of the one or more words in the document. OCR engine 126 can identify patterns from the midpoints of each of the one or more words in the document based on the detection of a plurality of midpoints with a substantially similar X or Y coordinate (e.g., an X or Y coordinate in the image within a threshold number of pixels).

OCR engine 126 can use, in some cases, localization information identifying the direction in which text is written in a local language to determine whether the probable orientation of the document is a horizontal orientation (corresponding to the pair of rotations including a 0 degree rotation and a 180 degree rotation from the captured image) or a vertical orientation (corresponding to a pair of rotations including a 90 degree clockwise rotation and a 90 degree anticlockwise rotation from the captured image). For example, in a language that uses a right-to-left or left-to-right writing convention, OCR engine 126 can determine that the document depicted in an image is oriented horizontally if OCR engine 126 identifies a plurality of patterns of successive text boxes having a substantially similar Y-axis coordinate value. For documents written in the same language, OCR engine 126 can determine that the document depicted in the image is oriented vertically if OCR engine 126 identifies a plurality of patterns of successive text boxes having a substantially similar X-axis coordinate value.

Figure 4:
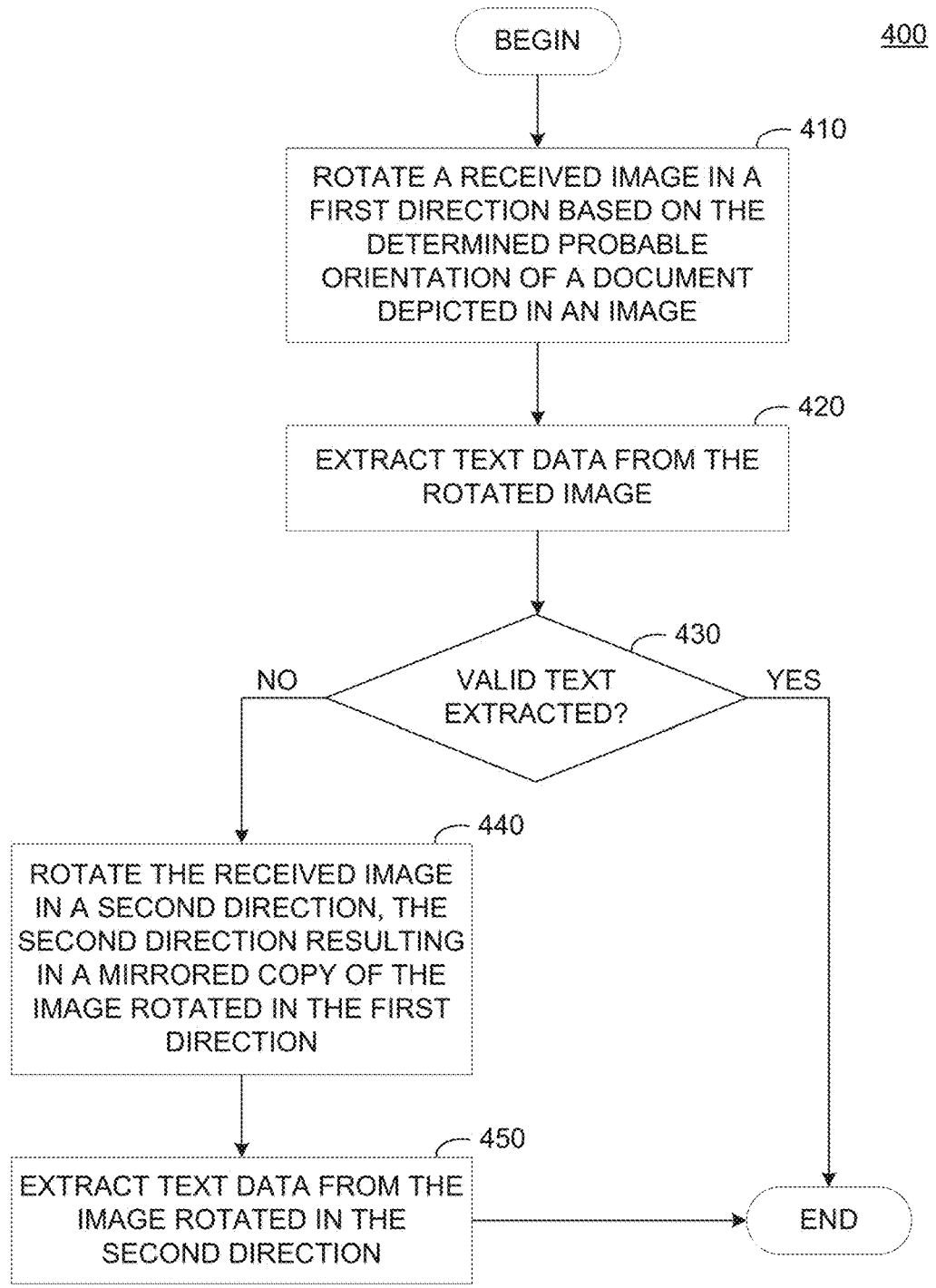
FIG. 4 illustrates an example method for extracting data from a document depicted in an image based on the detected probable orientation of the document, according to one embodiment.

FIG. 4 illustrates example operations that may be performed by an OCR engine 126 for extracting text from a document based on the determined probable orientation of the document, according to an embodiment.

As illustrated, operations 400 begin at step 410, where OCR engine 126 rotates an image depicting a document in a first direction based on the determined probable orientation of the document depicted in the image. As discussed above, if OCR engine 126 determines that the document is oriented horizontally or substantially horizontally, OCR engine 126 need not perform an initial rotation on the received image (e.g., where the first rotation is a 0 degree rotation of the received image). Otherwise, OCR engine 126 can rotate the image by 90 degrees (clockwise or anticlockwise) before attempting to extract text from the document.

At step 420, OCR engine 126 extracts text from the document depicted in the received image. As discussed above, OCR engine 126 can attempt to extract text from the document depicted in the received image by matching patterns of white and black pixels to characters in a character set. OCR engine 126 can return a series of valid characters (e.g., characters that are in a character set in which a document is expected to be written), characters that are in a different character set, or an indication that OCR engine 126 was unable to extract text from the document.

At step 430, OCR engine 126 determines whether valid text was extracted from the document. In some cases, to determine if valid text was extracted from the document, OCR engine 126 can compare words or strings of characters extracted from the document with words in a dictionary. If OCR engine 126 determines that the words or strings of characters extracted from the document match words in a dictionary, OCR engine 126 can determine that valid text was extracted from the document. In some cases, where the characters extracted from a document are mostly numerical or symbols, OCR engine 126 can determine whether valid text was extracted from the document based on whether the characters extracted from the document are members of a valid character set. If OCR engine 126 determines that valid text was extracted from the document, OCR engine 126 need not take any further action to extract text from the document depicted in an image.

Otherwise, at step 440, OCR engine 126 rotates the received image in a second direction. The second direction may result in the generation of a second image that is rotated 180 degrees (mirrored about the horizontal axis or vertical axis) from the first image on which OCR engine 126 attempted to extract text. As discussed above OCR engine 126 can rotate the image in the second direction by applying a 180 degree rotation to the first image or by applying a second rotation angle specified in a pair of rotations to the received image.

At step 450, OCR engine 126 extracts text from the image rotated in the second direction. As discussed above, because OCR engine determined that the probable orientation of the document depicted in the received image was one of two choices, OCR engine 126 can assume that the text extracted from the image rotated in the second direction will be valid text. After extracting text from the image rotated in the second direction, OCR engine 126 can pass the extracted text to application 124 for processing or transmission to an application service 130 for remote processing.

Figure 5A:
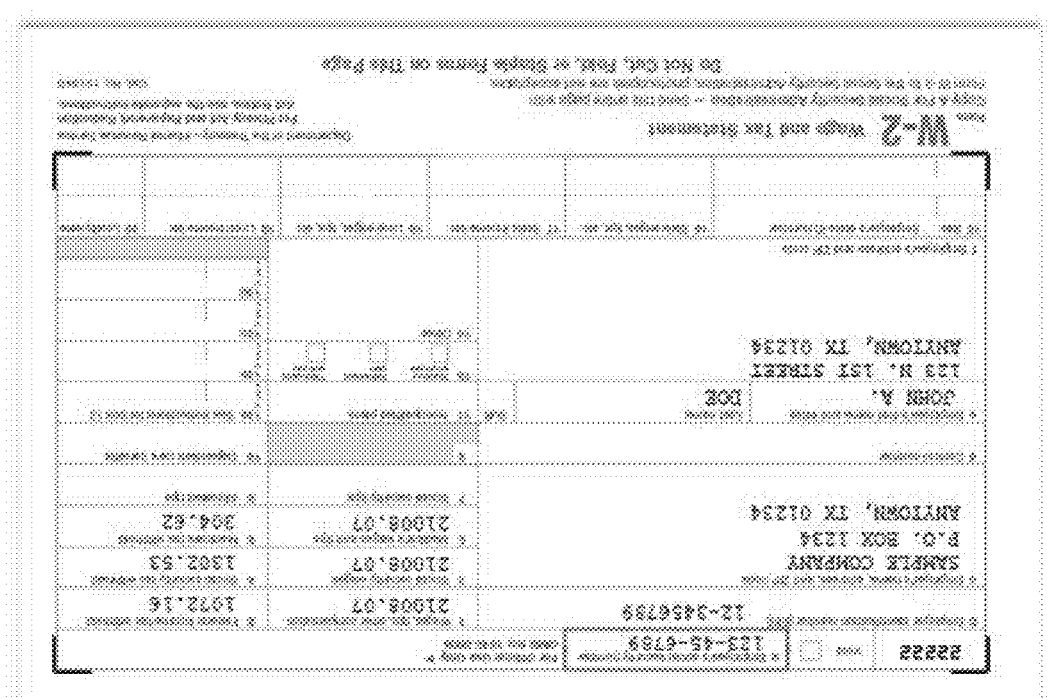
FIGS. 5A-5B illustrate an example of using textual midpoint detection on text displayed in a document to determine a probable orientation of the document, according to one embodiment.

FIG. 5A illustrates an example of a captured image 500A of a document from which OCR engine 126 is to extract text. As illustrated, image 500A is a W-2 form illustrating a recipient's wages for a tax year and is captured upside down (e.g., rotated by 180 degrees from the correct orientation for the document).

Figure 5B:
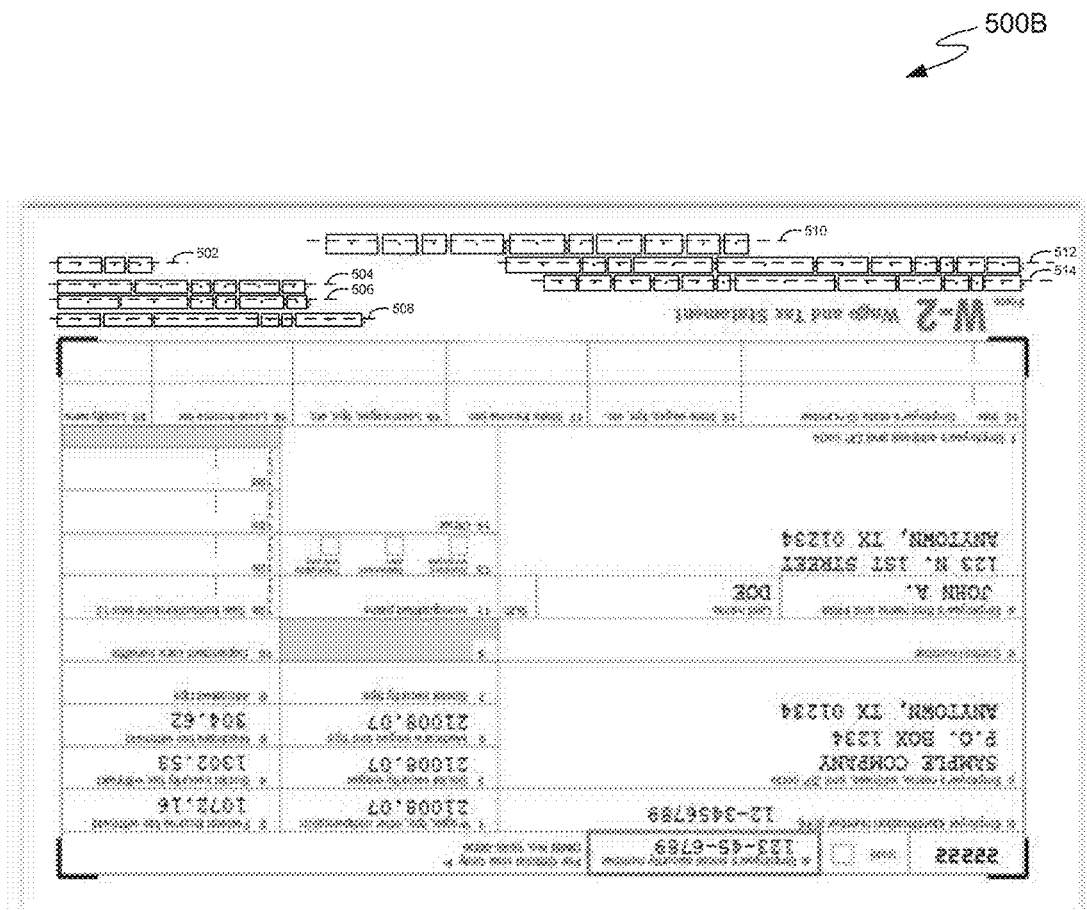

FIG. 5B illustrates an overlay 500B of boxes and midpoints over strings of text present in the document depicted in image 500A. As illustrated, OCR engine 126 can overlay a plurality of boxes over regions of image 500A corresponding to unbroken sequences of characters. For each box, OCR engine 126 can calculate a midpoint representing the midpoint of a string of characters as X-Y pixel coordinates in the image.

After OCR engine 126 overlays boxes over regions of text and determines a midpoint for each of the plurality of boxes, OCR engine 126 can attempt to identify one or more lines of text in the document. As discussed above, OCR engine 126 can identify one or more lines of text in the document based on a positioning of text midpoints that have a substantially similar X or Y axis coordinate in the image. As illustrated, because midpoints for a plurality of boxes have a substantially similar Y axis coordinate in the image, OCR engine 126 can identify a plurality of lines of text 502, 504, 506, 508, 510, 512, and 514. Thus, OCR engine 126 can determine that the document is likely in a horizontal framing and that the probable orientations of the document are as received (a 0 degree rotation of the received image) and flipped over the horizontal axis (a 180 degree rotation of the received image).

As discussed above, OCR engine 126 can attempt to extract text from the image 500A as received. Because image 500A depicts an upside-down version of a document, OCR engine 126 will not be able to successfully extract text from image 500A as received. Thus, OCR engine 126 performs a 180-degree rotation of image 500A and attempts to extract text from the rotated version of the image (which includes a depiction of the document in the proper orientation, with text positioned left-to-right and top-to-bottom).

Figure 6:
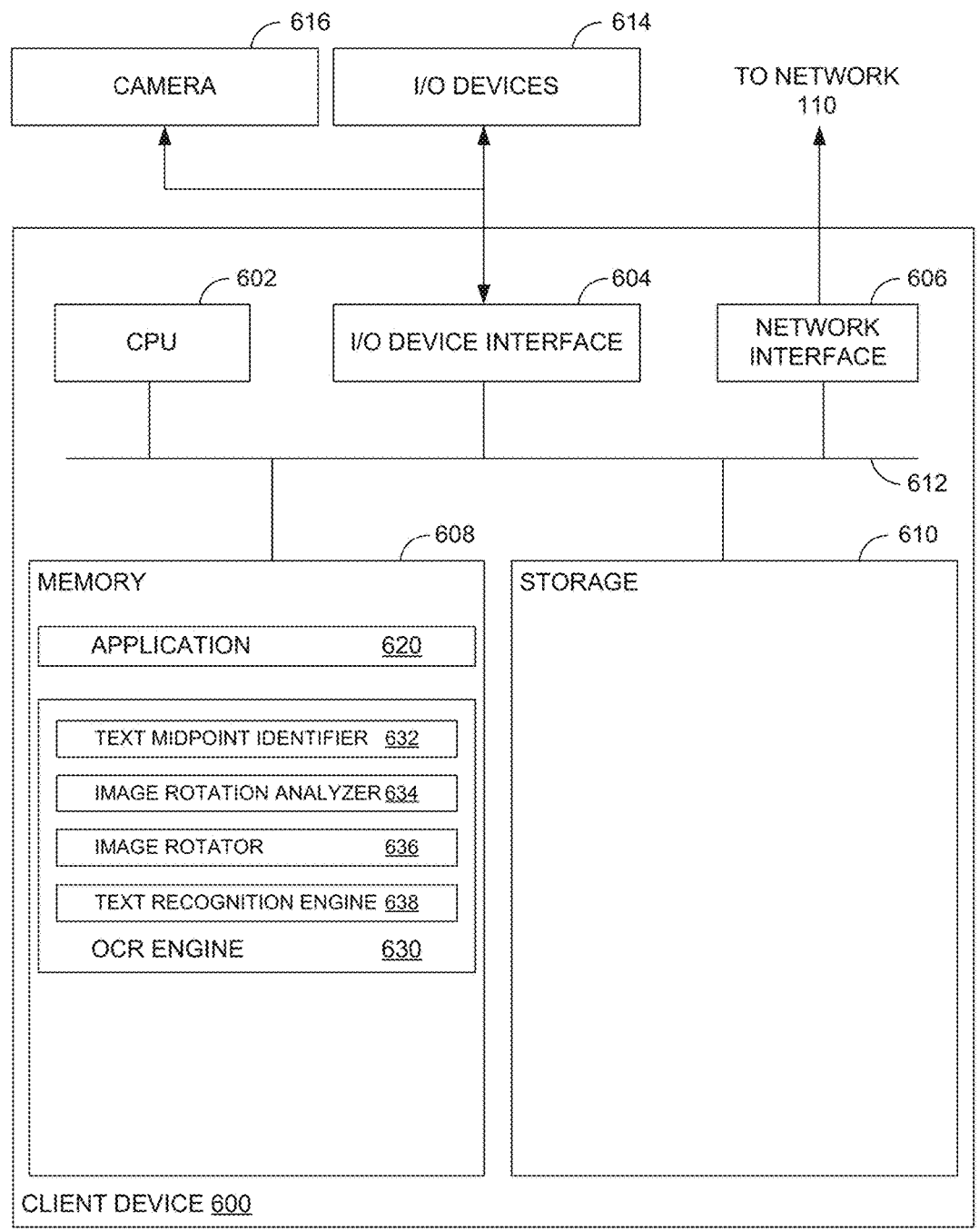
FIG. 6 illustrates an example computing system for performing optical character recognition on a document depicted in an image based on a detected probable orientation of the document, according to one embodiment.

FIG. 6 illustrates an example client device that uses midpoint detection and analysis to determine a probable orientation of a document on which optical character recognition (OCR) processes are to be performed, according to an embodiment. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) and camera 616 to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 generally includes an application 620 and an optical character recognition (OCR) engine 630. Application 620 may host a variety of workflows that process data received from an image of a document locally and/or provide data received from an image of a document to a remote application service 130 for processing via network interface 606. Application 620 generally provides an interface in which a user can invoke OCR engine 630 to import data from an image of a document into the application 620 for processing.

OCR engine 630, as illustrated, generally includes a text midpoint identifier 632, image rotation analyzer 634, image rotator 636, and text recognition engine 638. Text midpoint identifier 632 receives an image depicting a document (or a portion of a document) from camera 616, binarizes the image, and attempts to identify blocks in the document corresponding to a word or string of characters. For each block in the document corresponding to a word or string of characters, text midpoint identifier 632 identifies a midpoint of the block as an X-Y coordinate in the image.

Image rotation analyzer 634 receives data from text midpoint identifier 632 including the X-Y coordinates of a plurality of text midpoints identified in an image of a document. Using the X-Y coordinates of the plurality of text midpoints, image rotation analyzer 634 can determine whether the probable orientation of the document in the image is vertical or horizontal. A probable vertical orientation may be represented by a threshold number of midpoints having a substantially similar X coordinate (horizontal positioning), and a probable horizontal orientation may be represented by a threshold number of midpoints having a substantially similar Y coordinate (vertical positioning). For a probable vertical orientation of a document, image rotation analyzer 634 can determine that a pair of rotations to apply to an image received from camera 616 includes a 90 degree clockwise rotation and 90 degree anticlockwise rotation. For a probable horizontal orientation of a document, image rotation analyzer 634 can determine that the pair of rotations to apply to the received image includes a 0-degree rotation (i.e., that image rotator 636 need not apply any rotation to the image) and a 180 degree rotation.

Image rotator 636 generally receives an indication of a direction in which to rotate a document from image rotation analyzer 634 and/or text recognition engine 638. After rotating the image in the indicated direction, image rotator 636 passes the rotated image to text recognition engine 638 for processing.

Text recognition engine 638 receives a rotated image from image rotator 636 and attempts to extract text from the image. If text recognition engine 638 is able to successfully extract text from the image (e.g., if the extracted text matches words in a dictionary or valid characters in a given character set), text recognition engine 638 can pass the extracted text to application 620 for processing or transmission to application service 130 for remote processing via network interface 606. Otherwise, text recognition engine 638 can request that image rotator 636 rotate the image using the second rotation in the pair of rotations specified by the probable orientation of the document.

Advantageously, by determining a probable orientation of a document prior to extracting text from the document, an OCR system can reduce the number of rotations and images to analyze in order to extract valid text from a document. In some cases, determining that an image of a document is oriented vertically or horizontally may entail a maximum of two character recognition attempts, as opposed to a maximum of four character recognition attempts by a system that does not attempt to determine a probable orientation of a document depicted in an image prior to attempting to extract text from the document. Accelerating the extraction of text from a document may reduce the amount of time that hardware components on a mobile device spend in an active state to obtain data from an image of a document and may improve the battery life of a mobile device on which an OCR process executes.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for performing optical character recognition on an image of a document, comprising:
    receiving the image of the document;
    identifying a plurality of text areas in the document, wherein each of the plurality of text areas corresponds to a continuous set of non-whitespace characters detected in the document;
    identifying a midpoint of each of the plurality of text areas in the document wherein the identified midpoint of each of the plurality of text areas has a pixel coordinate location in a two-dimensional space;
    detecting one or more lines of text in the document, wherein each of the one or more lines of text comprises a set of text areas having midpoints with a vertical pixel coordinate located within a threshold number of pixels on a vertical axis in the two-dimensional space or a horizontal pixel coordinate located within a threshold number of pixels on a horizontal axis in two-dimensional space;
    determining a probable orientation of the document based on an orientation of the detected one or more lines of text, wherein the probable orientation indicates that lines of text in the document are oriented parallel with a vertical axis or a horizontal axis; and
    extracting text from the image based on the determined probable orientation of the document.

2. The method of claim 1, wherein the probable orientation of the document comprises a first rotation angle and a second rotation angle, and wherein the second rotation angle differs from the first rotation angle by 180 degrees.

3. The method of claim 2, wherein extracting text from the image comprises:
    generating a first image by rotating the received image by the first rotation angle;
    extracting text from the first image; and
    upon determining that the extracted text from the first image comprises valid text, returning the extracted text to an application for processing.

4. The method of claim 3, further comprising:
    upon identifying a failure to extract valid text from the first image:
        generating a second image by rotating the received image by the second rotation angle; and
        extracting text from the second image.

5. The method of claim 4, wherein identifying a failure to extract valid text from the first image comprises determining that a number of strings extracted from the first image do not match strings in a dictionary of known words.

6. The method of claim 1, wherein determining the probable orientation of the document comprises determining that the image is mirrored about a vertical axis if the detected one or more lines of text include a plurality of text areas with a similar midpoint on a vertical axis of the image.

7. The method of claim 1, wherein determining the probable orientation of the document comprises determining that the image is mirrored about a horizontal axis if the detected one or more lines of text include a plurality of text areas with a similar midpoint on a horizontal axis of the image.

8. A non-transitory computer-readable medium comprising instructions which, when executed on a processor, performs an operation for performing optical character recognition on an image of a document, the operation comprising:
    receiving the image of the document;
    identifying a plurality of text areas in the document wherein each text area corresponds to a continuous set of non-whitespace characters detected in the document;
    identifying a midpoint of each of the plurality of text areas in the document, wherein the identified midpoint of each of the plurality of text areas has a pixel coordinate location in a two-dimensional space;
    detecting one or more lines of text in the document, wherein each of the one or more lines of text comprises a set of text areas, wherein the set of text areas have midpoints with a vertical pixel coordinate located within a threshold number of pixels on a vertical axis in the two-dimensional space or a horizontal pixel coordinate located within a threshold number of pixels on a horizontal axis in the two-dimensional space, and wherein each of the plurality of text areas is associated with a midpoint having a coordinate within a threshold number of pixels on one axis in a two-dimensional space;

determining a probable orientation of the document based on an orientation of the detected one or more lines of text, wherein the probable orientation indicates that lines of text in the document are oriented parallel with a vertical axis or a horizontal axis; and extracting text from the image based on the determined probable orientation of the document.

9. The non-transitory computer-readable medium of claim 8, wherein the probable orientation of the document comprises a first rotation angle and a second rotation angle, and wherein the second rotation angle differs from the first rotation angle by 180 degrees.

10. The non-transitory computer-readable medium of claim 9, wherein extracting text from the image comprises:
generating a first image by rotating the received image by the first rotation angle;
extracting text from the first image; and
upon determining that the extracted text from the first image comprises valid text, returning the extracted text to an application for processing.

11. The non-transitory computer-readable medium of claim 10, wherein the operation further comprises:
upon identifying a failure to extract valid text from the first image:
generating a second image by rotating the received image by the second rotation angle; and
extracting text from the second image.

12. The non-transitory computer-readable medium of claim 11, wherein identifying a failure to extract valid text from the first image comprises determining that a number of strings extracted from the first image do not match strings in a dictionary of known words.

13. The non-transitory computer-readable medium of claim 8, wherein determining the probable orientation of the document comprises one of:
determining that the image is mirrored about a vertical axis if the detected one or more lines of text include a plurality of text areas with a similar midpoint on a vertical axis of the image; or
determining that the image is mirrored about a horizontal axis if the detected one or more lines of text include a plurality of text areas with a similar midpoint on a horizontal axis of the image.

14. A system, comprising:
a processor; and
a memory comprising instructions which, when executed on the processor, performs an operation for performing an operation for performing optical character recognition on an image of document, the operation comprising:
receiving the image of the document;
identifying a plurality of text areas in the document wherein each text area corresponds to a continuous set of non-whitespace characters detected in the document;
identifying a midpoint of each of the plurality of text areas in the document, wherein the identified midpoint of each of the plurality of text areas has a pixel coordinate location in a two-dimensional space;
detecting one or more lines of text in the document, wherein each of the one or more lines of text comprises a set of text areas, wherein the set of text areas have midpoints with a vertical pixel coordinate located within a threshold number of pixels on a vertical axis in the two-dimensional space or a horizontal pixel coordinate located within a threshold number of pixels on a horizontal axis in two-dimensional space;
determining a probable orientation of the document based on an orientation of the detected one or more lines of text, wherein the probable orientation indicates that lines of text in the document are oriented parallel with a vertical axis or a horizontal axis; and
extracting text from the image based on the determined probable orientation of the document.

15. The system of claim 14, wherein the probable orientation of comprises a first rotation angle and a second rotation angle, and wherein the second rotation angle differs from the first rotation angle by 180 degrees.

16. The system of claim 15, wherein extracting text from the image comprises:
generating a first image by rotating the received image by the first rotation angle;
extracting text from the first image; and
upon determining that the extracted text from the first image comprises valid text, returning the extract text to an application for processing.

17. The system of claim 16, wherein the operations further comprises:
upon identifying a failure to extract valid text from the first image:
generating a second image by rotating the received image by the second rotation angle; and
extracting text from the second image.

18. The system of claim 17, wherein identifying a failure to extract valid text from the first image comprises determining that a number of strings extracted from the first image do not match strings in a dictionary of known words.

19. The system of claim 14, wherein determining the probable orientation of the document comprises determining that the image is mirrored about a vertical axis if the detected one or more lines of text include a plurality of text areas with a similar midpoint on a vertical axis of the image.

20. The system of claim 14, wherein determining the probable orientation of the document comprises determining that the image is mirrored about a horizontal axis if the detected one or more lines of text include a plurality of text areas with a similar midpoint on a horizontal axis of the image.

* * * * *